United States Patent
Sisson, Jr. et al.

(10) Patent No.: US 6,848,572 B1
(45) Date of Patent: Feb. 1, 2005

(54) MODULAR CONVEYOR SYSTEM

(75) Inventors: Thomas Preston Sisson, Jr., Forest, VA (US); Willie Levi Mills, Jr., Lynchburg, VA (US); Rodney Gene Gustad, Bedford, VA (US)

(73) Assignee: Danville Automation Holdings LLC, Lynchburg, VA (US)

( * ) Notice: Subject to any disclaimer, the term of this patent is extended or adjusted under 35 U.S.C. 154(b) by 0 days.

(21) Appl. No.: 10/704,941

(22) Filed: Nov. 10, 2003

(51) Int. Cl.$^7$ ............................................. B65G 21/00
(52) U.S. Cl. ................................................. 198/860.1
(58) Field of Search .......................... 198/860.1, 861.1, 198/850, 851, 841

(56) References Cited

U.S. PATENT DOCUMENTS

| | | | |
|---|---|---|---|
| 3,605,994 A | * | 9/1971 | Parlette ................. 198/861.1 |
| 3,669,247 A | * | 6/1972 | Pulver ..................... 198/841 |
| 3,878,937 A | | 4/1975 | Glaser et al. |
| 4,164,283 A | * | 8/1979 | Flajnik ..................... 198/840 |
| 4,535,963 A | | 8/1985 | Lachonius |
| 4,562,921 A | | 1/1986 | Leemkuil et al. |
| 4,597,492 A | | 7/1986 | Lachonius |
| 4,727,981 A | | 3/1988 | Johansson |
| 4,838,412 A | | 6/1989 | Backman |
| 4,930,623 A | | 6/1990 | Johnson et al. |
| 4,951,809 A | * | 8/1990 | Boothe et al. .............. 198/841 |
| 4,961,492 A | * | 10/1990 | Wiseman et al. ........... 198/841 |
| 4,967,897 A | | 11/1990 | Lachonius et al. |
| 5,137,145 A | * | 8/1992 | Clopton ................... 198/860.2 |
| 5,186,314 A | | 2/1993 | Clopton |
| 5,316,134 A | | 5/1994 | Donohue |
| 5,788,056 A | | 8/1998 | Clopton |
| 6,059,097 A | | 5/2000 | Clopton |
| 6,196,376 B1 | | 3/2001 | Grabmann et al. |
| 6,227,354 B1 | | 5/2001 | Howden et al. |
| 6,347,699 B1 | * | 2/2002 | Ramsey ..................... 198/852 |
| 6,364,094 B1 | | 4/2002 | Alstmar |
| 6,367,619 B1 | | 4/2002 | Cemke, Jr. et al. |
| 6,374,989 B1 | | 4/2002 | van Dyke, Jr. et al. |
| 6,427,830 B1 | | 8/2002 | Ciccorilli |

* cited by examiner

*Primary Examiner*—Richard Ridley
(74) *Attorney, Agent, or Firm*—St. Onge Steward Johnston & Reens LLC

(57) ABSTRACT

A conveyor system providing for convertibility of existing and new conveyor equipment, incorporating use of a double "T" slot for mounting the conveyor beam to existing equipment and/or connecting existing accessories to the new conveyor beam and for ease of conveyor chain interchangeability while providing for a robust conveyor chain assembly.

20 Claims, 8 Drawing Sheets

MODULAR CONVEYOR SYSTEM

FIELD OF THE INVENTION

This invention relates to conveyor systems and, more specifically, to conveyor systems comprising conveyor beams, conveyor chain pieces and mounting means for conveyor accessories.

BACKGROUND OF THE INVENTION

Efforts to improve industrial plant efficiency have generated interest in making industrial plants relatively quickly and easily convertible from one industrial process to another. Convertibility of industrial plants permits plant managers to stay abreast of and provide for the demands of the marketplace. A very important component of virtually every industrial plant is conveyor systems. Therefore, the convertibility of conveyor systems is very important to the convertibility of industrial plants. In the conveyor system art, convertibility relates to accommodating articles having various sizes, shapes and physical characteristics.

One particular feature of convertibility is the ease by which a conveyor chain is removable from a conveyor beam. The easier and quicker it is to remove and change out a conveyor chain, the more convertible the industrial plant is.

Another important aspect of conveyor systems is interchangeability. As a conveyor line is converted from one configuration to another, it may be advantageous to utilize accessories supplied by various manufacturers depending on the article of manufacture to be run. Therefore, having a conveyor beam that is able to accommodate many varying accessories is critical to interchangeability and convertibility. It is also critical to provide a conveyor beam that is easy to retrofit with, for instance, existing conveyor equipment.

Extruded conveyor beams have been utilized for many years. Typically these beams have had, when viewed in longitudinal cross-section, sidewalls extending above and below a center section and flanges extending inwardly from the upper and lower ends of the sidewalls to carry conveyor chains. Typically, the conveyor chain will ride on top of the upper flanges while transporting an article to a selected destination, and is then inverted, riding on the lower flanges on the return trip, the lower flanges keeping the conveyor chain from falling out of the beam.

Generally, these beams have presented a symmetrical longitudinal cross section. This means that the sidewalls and flanges that extend upwardly from the center section have mirrored counter parts that extend downwardly from the center section such that the upper and lower sidewalls and flanges have exactly the same measurements.

This presents the disadvantage that, to remove the conveyor chain in order to retool the conveyor system, the beam must be dismantled at a selected location and the chain removed at that point, typically from an end section. Further, the replacement conveyor chain must then be inserted at the removal point and the beam reconnected. This process is difficult and time consuming, greatly increasing the costs associated with retooling a line.

A number of patents have attempted to deal with this problem with limited success. For instance, U.S. Pat. No. 4,961,492 to Wiseman et al. ("the '492 patent") discloses the use of differing wearstrips, one that will permit the conveyor chain to freely be lifted out of the beam and the other that will securely hold the conveyor chain to the beam. The beam is designed such that the conveyor chain may freely be lifted out at any point, while the placement of the wearstrips determines where the conveyor chain will be freely removable. However, a disadvantage of the '492 patent is that the beam is taught to be symmetrical in cross-section from top to bottom such that the wearstrips must retain the conveyor chain in the beam when, for instance, inverted, and the wearstrips must structurally bear the weight of the inverted conveyor chain rather than the flange itself which typically comprises an extruded material such as aluminum ('492 patent, FIGS. 2, 5, col. 4, 42–55). Any subsequent failure of the conveyor equipment that causes a shutdown of the line can be very expensive, both in terms of repair costs and shutdown time. The '492 patent further teaches that the conveyor chain used has plastic protrusions designed to engage with the specially designed wearstrips to hold the conveyor chain to the beam ('492 patent, FIGS. 2, 5, col. 5, lines 26–33 and 62–68, and col. 7, lines 2–9). This is also undesirable because the conveyor chain is only maintained in the beam by plastic tabs rather than by a more robust means. In addition, the specially designed wearstrips add complexity and cost to the system, as do the specially designed conveyor chain pieces with the small plastic tabs. Still further, the '492 patent fails to teach or disclose the use of mounting recess capable of receiving many varying accessories or retrofitting to existing equipment (such as a double-T slot recess), located in the sides of the outer walls of the beam. Instead, the '492 patent only teaches the use of a single slot which will limit interchangeability and the ability to retrofit the beam to, for instance, existing equipment ('492 patent, FIG. 2, col. 4, lines 53–57).

U.S. Pat. No. 5,316,134 to Donohue ("the '134 patent") has further tried to address this issue with limited success. The '134 patent discloses a conveyor system where the conveyor chain may be lifted out of the top of the beam while still holding the conveyor chain to the beam on the bottom of the beam. This method, like the '492 patent, discloses that the conveyor chain utilized has plastic protrusions designed to engage with the lower flanges ('134 patent, FIG. 1, col. 3, lines 15–21). However, as previously stated, it is undesirable to have the conveyor chain structurally maintained in the beam only by small plastic tabs. This conveyor chain also adds cost and complexity to the system. In addition, the '134 patent fails to provide any means by which to attach to the side of the beam, excluding the use of many standard accessories thereby severely limiting interchangeability, convertibility and the ability to retrofit the system. In fact, the '134 patent specifically teaches that no cavities or recesses may be located in the outer walls ('134 patent, FIG. 1, col. 1, lines 61–68). Further, the lower run of the conveyor chain is not freely accessible as it is enclosed on both sides by the downwardly extending sidewalls. ('134 patent, FIG. 1, col. 1, lines 67–68, col. 2, lines 1–4 and 7–13). This lack of accessibility can greatly increase the difficulty in servicing or repairing the system, for instance, if the conveyor chain is damaged.

U.S. Pat. No. 6,374,989 to van Dyke, Jr. et al. ("the '989 patent") discloses the use of a double-T slot recess located on the outer wall of the conveyor beam. ('989 patent, FIGS. 4, 7, 8, 21 and 24). However, the '989 patent teaches away from having flanges that extend inward such that the conveyor chain may freely be lifted out of the beam from the top. ('989 patent, FIGS. 4, 7, 8, 21 and 24). For instance, the '989 patent teaches that the "edge walls 68 and 70 include ledge portions 76 and 78 (FIG. 4) located at a predetermined height above the conveyor belt 60 and projecting over the conveyor belt 60" and that the "ledge portions 76 and 78 cooperate with the conveyor belt 60 to form a vertical confinement . . . and hold a sample tube." ('989 patent, col. 5, lines 54–60.) This confinement is critical to the proper functioning of delivering tubes of "different heights and diameter." ('989 patent, col. 5, line 61.) The '989 patent then, specifically teaches against removability of the conveyor chain from the top of the beam. In addition, although flanges are provided on the bottom of the beam, the conveyor chain disclosed in the '989 patent is never inverted such that the lower flanges of the beam are not utilized. Therefore, the '989 patent fails teach use of differing flanges from top to bottom such that the lower flanges engagingly hold the conveyor chain to the beam while the top flanges facilitate removal of the conveyor chain. Therefore, this configuration severely limits convertibility and interchangeability of the conveyor system.

What is desired is a conveyor system that allows easy removal of a conveyor chain while at the same time facilitates attachment of many various accessories and/or attachments to the side of the beam.

It is further desired to provide a conveyor system that provides a means of removeably engaging the conveyor chain to a beam that is simple, cost effective and structurally robust.

It is still further desired to provide a conveyor system that allows easy removal of a simple conveyor chain that is accessible on both the top and bottom run.

It is yet further desired to provide a conveyor system that minimizes the costs and time associated with repair and/or replacement of the various conveyor components.

It is still further desired to provide a conveyor system that facilitates retrofitting of newer and older conveyor equipment.

SUMMARY OF THE INVENTION

These and other objectives are achieved in one advantageous embodiment of the present invention, by providing a conveyor beam having upper and lower flanges such that the conveyor chain may easily be lifted out of the top of the beam. In addition, when inverted, the conveyor chain is securely held to the conveyor beam by the lower flanges, which engage protrusions located on the conveyor chain pieces. The conveyor chain pieces further have an opening located at the front of each conveyor chain piece for receiving a pin. The protrusions also each have an opening for receiving a pin, such that the individual conveyor chain pieces are securely held to one another in an end-to-end fashion. The pin extends through the protrusions and beyond the lower flanges such that the pin adds structural support for maintaining the conveyor chain in the conveyor beam when the chain engages the lower flanges.

A further advantageous aspect of the present invention is the provision of a double-T slot recess provided in the outer walls and running along at least a portion of the length of the conveyor beam. What is meant by a double-T slot is, when viewed in cross-section, the beam presents two adjacent rectangular cavities, an inner cavity and an outer cavity, where the inner cavity has an opening that opens into the outer cavity and the outer cavity has an opening that opens to the environment. The two cavities are of differing sizes to accommodate attachment of a variety of differing equipment and retrofitting to existing equipment. Generally the inner cavity presents a larger cross-section than the outer cavity, but this is not required.

In one advantageous embodiment of the present invention, a conveyor system is provided comprising a conveyor beam having a pair of integrally formed upper flanges defining an upper channel having a width (W1) and a pair of integrally formed lower flanges defining a lower channel having a width (W2), the width (W2) being smaller than the width (W1) of the upper channel. The system further comprises a conveyor chain having a retaining portion which has a width (W3) larger than the width (W2) of the lower channel, but smaller than the width (W1) of the upper channel, the retaining portion being positioned on said chain such that the chain is restrained in the lower channel, but is adapted to be freely lifted out of the upper channel. The retaining portion further has an opening extending therethrough for receipt of a pin to connect various chain sections together, the pin having a width (W4) larger than the width (W2) of the lower channel, but smaller than the width (W1) of the upper channel.

In another advantageous embodiment of the present invention, a conveyor system is provided comprising a conveyor beam having a pair of integrally formed upper flanges defining an upper channel having a width (W1), a pair of integrally formed lower flanges defining a lower channel having a width (W2), the width (W2) being smaller than the width (W1) of the upper channel, and a double-T slot cavity located in outer walls of said conveyor beam and extending longitudinally along at least a portion of the length of said conveyor beam. The system is also provided so that the conveyor beam is adapted to receive a conveyor chain having a retaining portion which has a width (W3) larger than the width (W2) of the lower channel, but smaller than the width (W1) of the upper channel such that the chain is restrained in the lower channel, but is adapted to be freely lifted out of the upper channel.

In still another advantageous embodiment of the present invention, a conveyor system is provided comprising a conveyor beam having a pair of integrally formed upper flanges defining an upper channel having a width (W1), a pair of integrally formed lower flanges defining a lower channel having a width (W2), the width (W2) being smaller than the width (W1) of the upper channel, and a double-T slot cavity located in outer walls of said conveyor beam and extending longitudinally along at least a portion of the length of said conveyor beam. The system further comprises a conveyor chain having a retaining portion which has a width (W3) larger than the width (W2) of the lower channel, but smaller than the width (W1) of the upper channel, the retaining portion being positioned on said chain such that the chain is restrained in the lower channel, but is adapted to be freely lifted out of the upper channel. The retaining portion further has an opening extending therethrough for receipt of a pin to connect various chain sections together, the pin having a width (W4) larger than the width (W2) of the lower channel, but smaller than the width (W1) of the upper channel.

The invention and its particular features and advantages will become more apparent from the following detailed description considered with reference to the accompanying drawings.

DETAILED DESCRIPTION OF THE DRAWINGS

Figure 1:
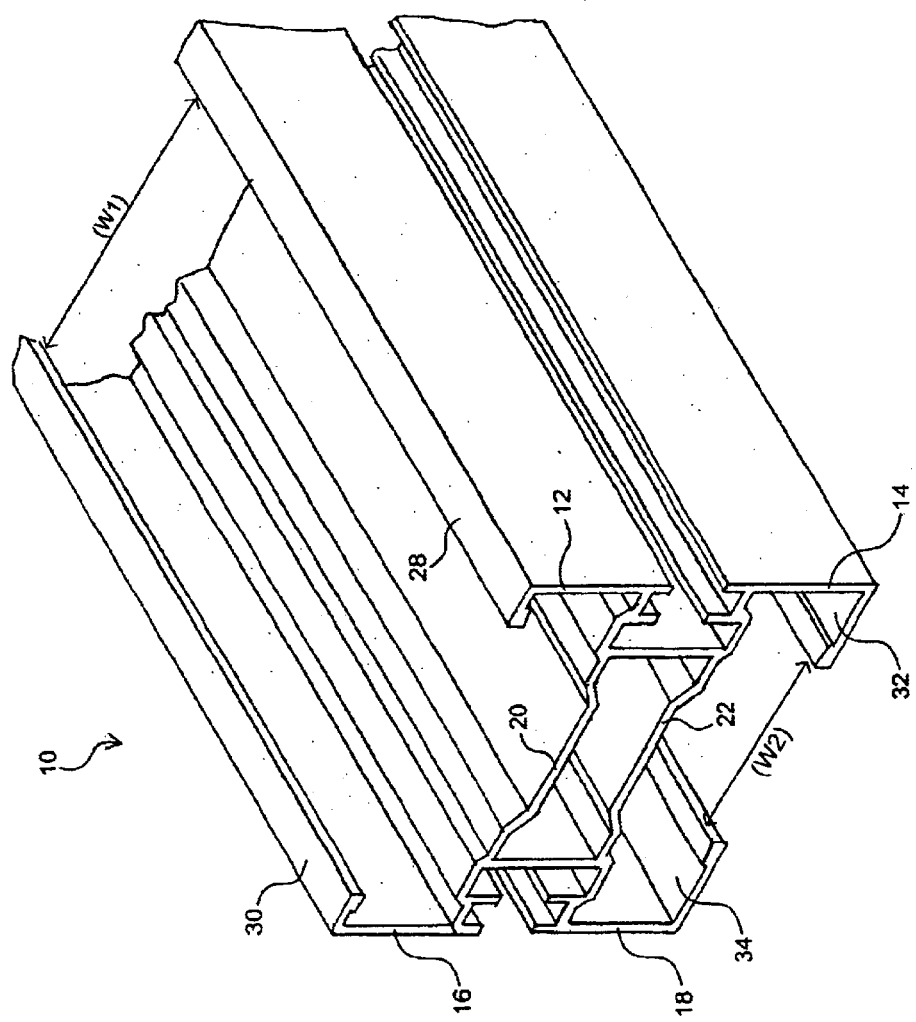
FIG. 1 is a perspective view of the conveyor beam according to one advantageous embodiment of the present invention.
Figure 2:
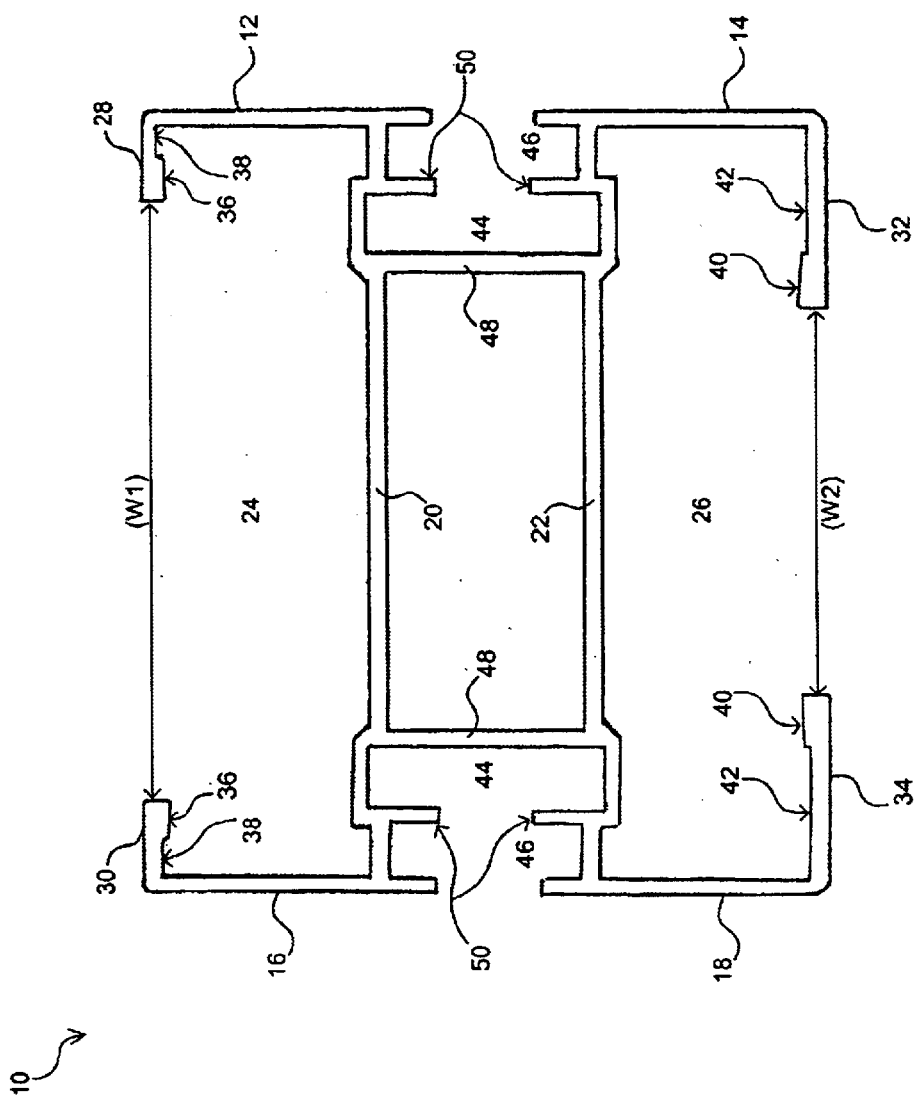
FIG. 2 is a cross-sectional view of the conveyor beam illustrated in FIG. 1.

FIGS. 1 and 2 generally illustrate the conveyor beam 10 according to one advantageous embodiment of the present invention and will be discussed together. FIG. 1 is a perspective drawing of conveyor beam 10, while FIG. 2 is a cross-sectional drawing of conveyor beam 10.

Generally, conveyor beam 10 presents an "H" shape configuration, having upper exterior walls 12, 16 and lower exterior walls 14, 18. Upper and lower exterior walls 12, 16, and 14, 18 are joined by a web generally comprising an upper web section 20 and a lower web section 22. Upper web section 20 joins upper exterior walls 12, 16, while lower web section 22 joins lower exterior walls 14, 18. Upper exterior walls 12, 16 and upper web section 20 generally define an upper cavity 24, which is generally rectangular in shape, while lower exterior walls 14, 18 and lower web section 22 generally define a lower cavity 26, which is also generally rectangular in shape. It can be seen from FIGS. 1 and 2 that upper and lower exterior walls 12, 16, and 14, 18 are provided along the length of conveyor beam 10 and generally extend perpendicular to the length of the conveyor beam 10.

Again referring to FIGS. 1 and 2, upper exterior walls 12, 16 further comprise upper flanges 28, 30 located at upper ends of upper exterior walls 12, 16. Upper flanges 28, 30 generally extend inwardly from upper exterior walls 12, 16, respectively, and each is substantially perpendicular to upper exterior walls 12, 16. The distance between upper flanges 28, 30 is indicated as width (W1).

Lower exterior walls 14, 18 also comprise lower flanges 32, 34 located at lower ends of lower exterior walls 14, 18. Lower flanges 32, 34 also generally extend inwardly from lower exterior wall 14, 18 and each is substantially perpendicular to lower exterior walls 14, 18. The distance between lower flanges 32, 34 is indicated as width (W2).

It can be seen from FIGS. 1 and 2 that width (W1) is generally larger than width (W2). While these widths may individually vary, width (W1) should always be provided such that it is larger than width (W2).

Also provided on upper flanges 28, 30 is a ridge 36 and a channel 38 for engaging with an upper wearstrip (not shown in FIGS. 1 and 2). In like manner, lower flanges 32, 34 are provided with a ridge 40 and a channel 42, which are also provided for engaging with a lower wearstrip (not shown in FIGS. 1 and 2).

A double "T" slot cavity is provided in the upper and lower exterior walls 12, 16, and 14,18. The double "T" slots run along at least a portion of the length of the conveyor beam 10 as illustrated in FIG. 1. The double "T" slot comprises an inner cavity 44 and an outer cavity 46. Inner cavity 44 is defined by an inner wall 48, which extends between upper web section 20 and lower web section 22. Upper web section 20 and lower web section 22 generally extend outwardly to engage upper and lower exterior walls 12, 16, and 14, 18, with a slight doglegging around inner cavity 44. In this particular embodiment, inner cavity 44 is larger than outer cavity 46. Inner cavity walls 50 define an opening from inner cavity 44 to outer cavity 46. Likewise, the ends of upper and lower exterior walls 12, 16, and 14, 18 define an opening from outer cavity 46 to the environment.

Inner cavity 44 and outer cavity 46 are generally illustrated as rectangular, with inner cavity 44 being larger than outer cavity 46, however, this is not necessary. For instance, outer cavity 46 could be larger than inner cavity 44. In addition, both or either cavity could be square-shaped or be elongated. Having differing sized cavities will provide greater interchangeability as many differing devices can be variously attached to the side of the conveyor beam 10. Typically, the cavities receive, for instance, a nut or engaging device that can be inserted into the cavity (inner or outer depending upon the size of the nut or engaging device) when positioned in one direction and when rotated, for instance, 90 degrees, engages with the cavity walls to securely hold to the exterior of the convey beam 10.

Conveyor beam 10 may be formed of any suitable rigid material, such as, for instance, aluminum or plastic. The conveyor beam 10 may also be formed via, for instance, an extruding process. In one advantageous embodiment, conveyor beam 10 is provided in discrete sections that may be connected to one another in an end-to-end fashion through connector plates (not shown) that are located in the double "T" slot cavities and span the joint formed between the two conveyor beams 10. Individual sections are also provided such that they can be formed or bent as desired according to the installation.

Figure 3:
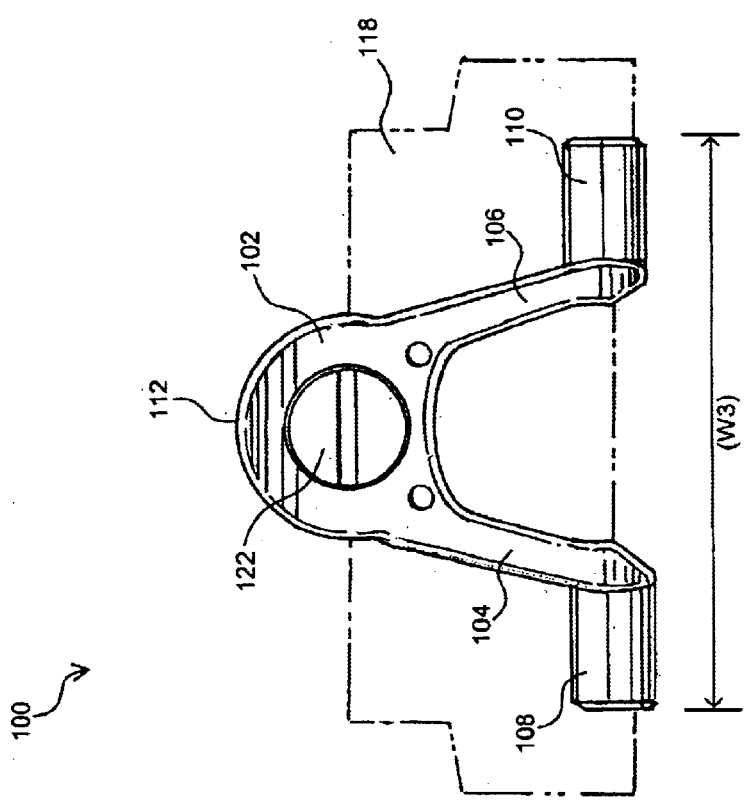
FIG. 3 is a bottom plan view of a conveyor chain piece according to one advantageous embodiment of the present invention.
Figure 4:
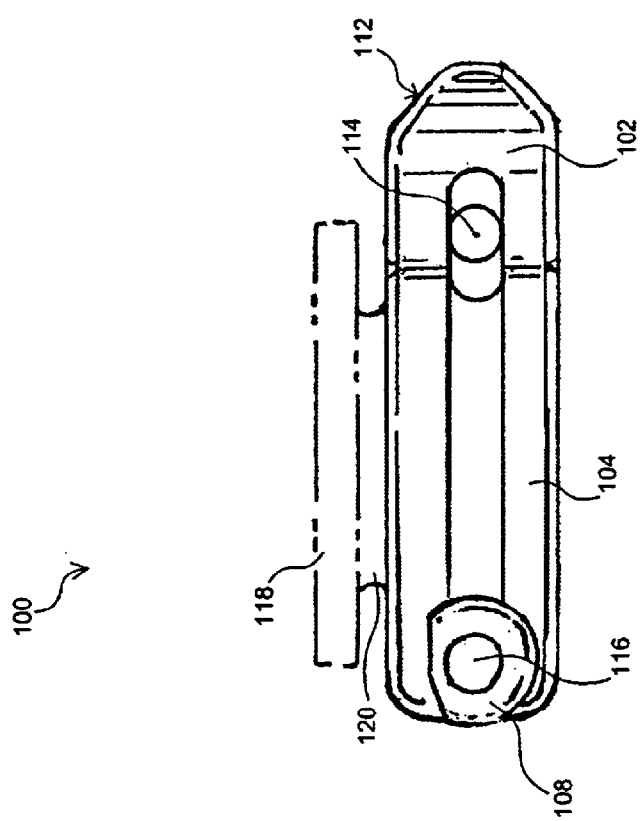
FIG. 4 is a side elevated view of the conveyor chain piece illustrated in FIG. 3.

FIG. 3 illustrates a bottom view of an individual conveyor chain piece 100, while FIG. 4 illustrates a side of the individual conveyor chain piece 100. As such, FIGS. 3 and 4 will be discussed together.

Conveyor chain piece 100 comprises a lower portion 102 that is generally circular and having arms 104, 106 extending generally tangentially from lower portion 102. Arms 104, 106 extend generally rearward from lower portion 102, based upon a path of travel of conveyor chain piece 100. In addition, the distance between arms 104, 106 expands slightly as the arms 104, 106 extend rearward from lower portion 102. The distance between arms 104, 106 will increase such that the diameter of the lower portion 102 can fit between arms 104, 106. Protrusions 108, 110 are located at the rearward ends of arms 104, 106 and extend generally perpendicular to arms 104, 106.

As can be seen in FIG. 4, protrusions 108, 110 present a generally round cross-section with a flat section located on the top of the protrusion. The distance between the end of protrusion 108 and protrusion 110 is defined as width (W3) depicted in FIG. 3. Width (W3) is provided such that it is smaller than width (W1) shown in FIGS. 1 and 2, but larger than width (W2), also illustrated in FIGS. 1 and 2. Protrusions 108, 110 are also each provided with a hole 116 designed to receive a pin (not shown in FIGS. 3 and 4), which extend therethrough and are each substantially axially aligned with each other.

Lower portion 102 further comprises a front section 112 that comprises tapered sections (both top and bottom) as can generally be seen in FIG. 4. Lower portion also comprises a hole 114, extending laterally through lower portion 102 and designed to receive a pin (not shown in FIGS. 3 and 4). Also provided in lower portion 102 is a knuckle joint 122. Knuckle joint 122 has a hole 114 extending laterally therethrough and is provided to rotate clockwise and counterclockwise as desired to facilitate lateral articulation of chain pieces when a pin (not shown in FIGS. 3 and 4) extends laterally therethrough to connect individual conveyor chain pieces together in an end-to-end fashion. Hole 114 presents a constant circular diameter through knuckle joint 122, but presents an expanding ellipse cross-section front-to-back as one travels outwardly from knuckle joint 122.

Conveyor chain piece 100 further comprises a top plate 118 and a transitional section 120 (seen in FIG. 4), which connects top plate 118 with lower portion 102. Top plate 118 may comprise any number of varying shapes and sizes depending upon the article that is to be transported, such that top plate 118 can be selected and rigidly attached to lower portion 102 depending upon the intended application. In addition, conveyor chain piece 100 generally comprises a lightweight rigid material, such as cast or molded plastic, but may also comprise any suitable material.

Figure 5:
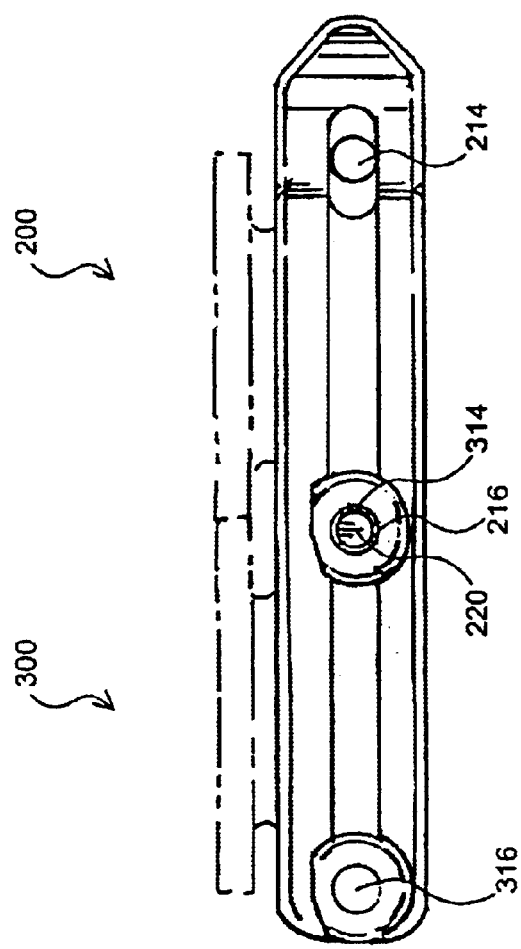
FIG. 5 is a side elevated view of two conveyor chain pieces per FIG. 4.
Figure 6:
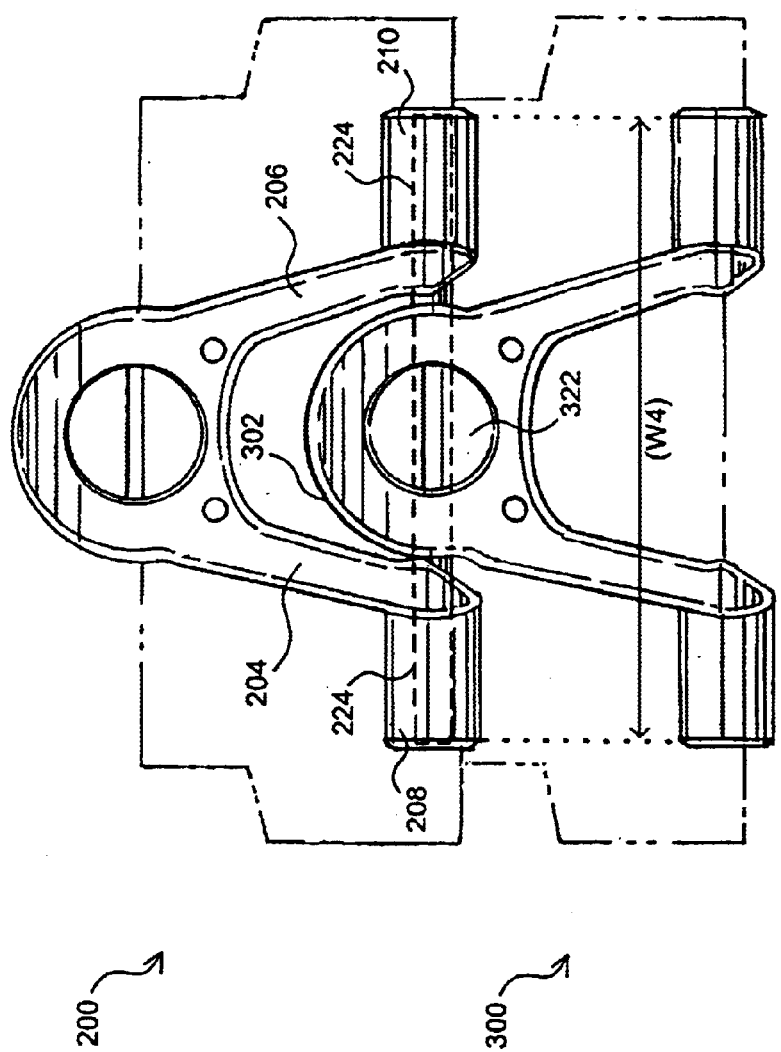
FIG. 6 is a bottom plan view of two conveyor chain pieces connected to one another.

FIGS. 5 and 6 generally depict multiple conveyor chain pieces 200, 300 shown connected to each other in an end-to-end fashion. Conveyor chain pieces 200, 300 generally correspond to conveyor chain piece 100 previously described in connection with FIGS. 3 and 4 such that the individual features of conveyor chain pieces 200, 300 will not be re-described here.

Conveyor chain pieces 200, 300 are engagingly secured to one another in an end-to-end fashion by means of pin 224 (illustrated in FIG. 6 as a dashed line). Conveyor chain piece 200 is provided such that the distance between arms 204, 206 is slightly larger than the diameter of lower portion 302. Pin 224 passes through hole 216 in protrusion 208, hole 314 in knuckle joint 322 located in lower section 302 and hole 216 in protrusion 210, thereby securing conveyor chain piece 200 to conveyor chain piece 300. Pin 224 is frictionally fit and maintained in holes 216. Conveyor chain pieces 200, 300 are provided such that lateral articulation via knuckle joint 322 and vertical articulation via rotation of the pin in knuckle joint 322 are possible.

Pin 224 may comprise any durable rigid material such as, for instance, steel or stainless steel. The width of pin 224 is illustrated in FIG. 6 as width (W4), which, in the illustrated embodiment, is slightly less than width (W3) as illustrated in FIG. 3. Width (W4) can be less than that illustrated in FIG. 6; however, it is advantageous to have pin 224 extend well into holes 216 located in protrusions 208, 210.

Figure 7:
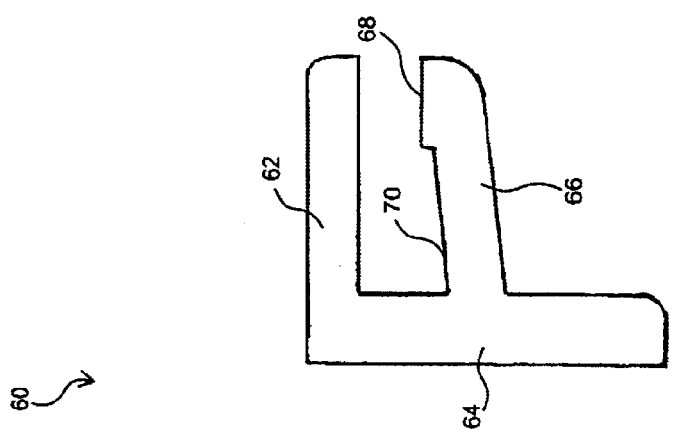
FIG. 7 is an end elevated view of a wearstrip according to one advantageous embodiment of the present invention.
Figure 8:
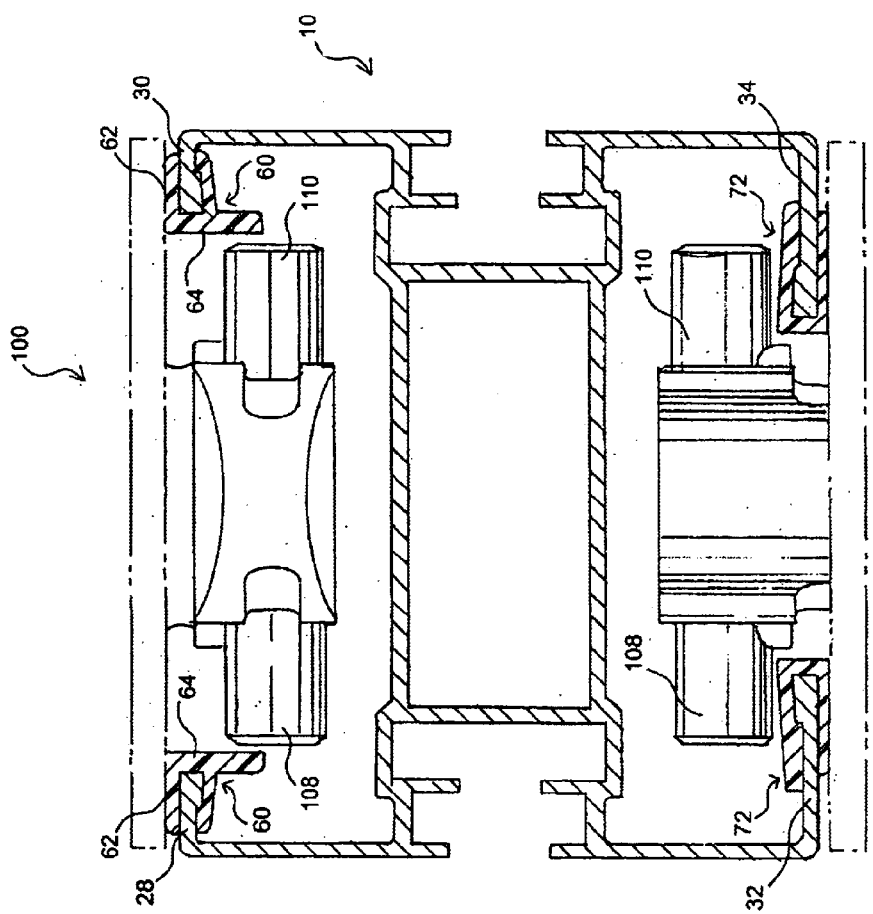
FIG. 8 is a cross-sectional view of the conveyor beam and conveyor chain according to another advantageous embodiment of the present invention.

Referring now to FIG. 7, a wearstrip 60 is provided for attachment to upper flanges 28, 30 and is shown in an engaged position with upper flanges 28, 30 in FIG. 8. Wearstrip 60 comprises an upper wear surface 62 that connects at an inside end with a vertical wear surface 64. Also connected to vertical wear surface 64 is an engaging portion 66. On an upper side of engaging portion 66 a ridge 68 and a channel 70 are provided. Ridge 68 and channel 70 are designed to engagingly mate with ridge 36 and channel 38 provided on upper flanges 28, 30 (see FIG. 2). Once wearstrip 60 is attached to upper flanges 28, 30, ridge 68 interacts with channel 38 and ridge 36 interacts with channel 70 such that wearstrip 60 is engagingly held to upper flanges 28, 30. Wearstrip 60 may comprise any suitable rigid or semi-rigid material.

FIG. 8 illustrates conveyor beam 10 with wearstrip 60 attached to upper flanges 28, 30, and conveyor chain piece 100 seated thereon. As can be seen in FIG. 8, top plate 118 of conveyor chain piece 100 rides along upper wear surface 62. As can also be seen, protrusions 108, 110 engage vertical wear surface 64, which prevents lateral displacement of conveyor chain piece 100 as it travels along a path of movement. Notably, width (W3) of protrusions 108, 110 is less than width (W1) between upper flanges 28, 30 such that conveyor chain piece 100 may freely be lifted out of upper cavity 24 of conveyor beam 10.

Also illustrated in FIG. 8 is inverted conveyor chain piece 100, shown inverted when, for instance, on a return path opposite a path of travel for the items to be transported. It can be seen from the drawing that lower flanges 32, 34 have wearstrips 72 mounted thereon, which engage with protrusions 108, 110. It can readily be seen that width (W3) of protrusions 108, 110 is greater than width (W2) between lower flanges 32, 34 such that conveyor chain piece 100 is engagingly held to lower flanges 32, 34 of conveyor beam 10 when inverted. It should also be noted that since width (W4) of pin 224 is slightly smaller than width (W3) of protrusions 108, 110, width (W4) is greater than width (W2) between lower flanges 32, 34. This is highly desireable because pin 224, which is made of a rugged material such as steel or stainless steel, will be part of the structure that engages with lower lower flanges 32, 34 holding chain piece 100 to conveyor beam 10.

Utilizing protrusions 108, 110 as a retaining portion to keep conveyor chain piece 100 engaged with conveyor beam 10 is desirable because it provides for a more robust engaging means due to pin 224 and for a simplified design of chain piece 100. In addition, both wearstrip 60 and wearstrip 72 comprise simple structures that are easy and cost effective to manufacture and install.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A conveyor system comprising:
    a conveyor beam having a pair of integrally formed upper flanges defining an upper channel having a width (W1) and a pair of integrally formed lower flanges defining a lower channel having a width (W2), the width (W2) being smaller than the width (W1) of the upper channel;
    a conveyor chain having a retaining portion which has a width (W3) larger than the width (W2) of the lower channel, but smaller than the width (W1) of the upper channel, the retaining portion being positioned on said chain such that the chain is restrained in the lower channel, but is adapted to be freely lifted out of the upper channel, the retaining portion further having an opening extending therethrough; and
    a pin having a width (W4) larger than the width (W2) of the lower channel, but smaller than the width (W1) of the upper channel, said pin located in the opening in the retaining portion.

2. The conveyor system according to claim 1 wherein said conveyor beam further comprises a double-T slot cavity located in outer walls of said conveyor beam and extending longitudinally along the length of said conveyor beam.

3. The conveyor system of claim 2 further comprising a second conveyor beam and a connection plate located in the double-T slot, the connection plate engagingly securing said conveyor beam to said second conveyor beam such that the conveyor chain may freely move from said conveyor beam to said second conveyor beam along a path of movement.

4. The conveyor system according to claim 1 wherein the pin comprises a rigid material.

5. The conveyor system according to claim 4 wherein the rigid material comprises stainless steel.

6. The conveyor system according to claim 1 wherein the pin is frictionally held in the opening extending through the retaining portion.

7. The conveyor beam system of claim 1 further comprising upper wearstrips that are detachably connectable to the upper flanges and have end sections extending perpendicular to the upper flanges, the end sections being provided to prevent lateral movement of said conveyor chain as said conveyor chain moves along a path of movement.

8. A conveyor system comprising:
a conveyor beam having:
  a pair of integrally formed upper flanges defining an upper channel having a width (W1);
  a pair of integrally formed lower flanges defining a lower channel having a width (W2), the width (W2) being smaller than the width (W1) of the upper channel; and
  a double-T slot cavity located in outer walls of said conveyor beam and extending longitudinally along at least a portion of the length of said conveyor beam;
    wherein the conveyor beam is adapted to receive a conveyor chain having a retaining portion which has a width (W3) larger than the width (W2) of the lower channel, but smaller than the width (W1) of the upper channel such that the chain is restrained in the lower channel, but is adapted to be freely lifted out of the upper channel.

9. The conveyor beam system of claim 8 further comprising upper wearstrips that are detachably connectable to the upper flanges and have end sections extending perpendicular to the upper flanges, the end sections being provided to prevent lateral movement of the conveyor chain as the conveyor chain moves along a path of movement.

10. The conveyor system of claim 9 further comprising lower wearstrips that are detachably connectable to the lower flanges.

11. The conveyor system of claim 8 wherein said conveyor beam comprises a rigid extruded material.

12. The conveyor system of claim 11 wherein the rigid extruded material is aluminum.

13. The conveyor system of claim 8 wherein the retaining portion of the conveyor chain further comprises an opening extending therethrough for receipt of a pin to connect various chain sections together.

14. The conveyor system of claim 13 wherein the pin has a width (W4) larger than the width (W2) of the lower channel, but smaller than the width (W1) of the upper channel.

15. A conveyor system comprising:
a conveyor beam having:
  a pair of integrally formed upper flanges defining an upper channel having a width (W1);
  a pair of integrally formed lower flanges defining a lower channel having a width (W2), the width (W2) being smaller than the width (W1) of the upper channel; and
  a double-T slot cavity located in outer walls of said conveyor beam and extending longitudinally along at least a portion of the length of said conveyor beam;
a conveyor chain having a retaining portion which has a width (W3) larger than the width (W2) of the lower channel, but smaller than the width (W1) of the upper channel, the retaining portion being positioned on said chain such that the chain is restrained in the lower channel, but is adapted to be freely lifted out of the upper channel, the retaining portion further having an opening extending therethrough;
a pin having a width (W4) larger than the width (W2) of the lower channel, but smaller than the width (W1) of the upper channel, said pin located in the opening in the retaining portion.

16. The conveyor beam system of claim 15 further comprising upper wearstrips that are detachably connectable to the upper flanges and have end sections extending perpendicular to the upper flanges, the end sections being provided to prevent lateral movement of the conveyor chain as the conveyor chain moves along a path of movement.

17. The conveyor system according to claim 15 wherein the pin comprises stainless steel.

18. The conveyor system according to claim 15 wherein the pin is frictionally held in the opening extending through the retaining portion.

19. A conveyor system comprising:
a conveyor beam having a pair of integrally formed upper flanges defining an upper channel having a width (W1) and a pair of integrally formed lower flanges defining a lower channel having a width (W2), the width (W2) being smaller than the width (W1) of the upper channel;
a conveyor chain having a retaining portion which has a width (W3) larger than the width (W2) of the lower channel, but smaller than the width (W1) of the upper channel, the retaining portion being positioned on said chain such that the chain is restrained in the lower channel, but is adapted to be freely lifted out of the upper channel.

20. The conveyor system according to claim 19 further comprising a double-T slot cavity located in outer walls of said conveyor beam and extending longitudinally along at least a portion of the length of said conveyor beam.

* * * * *